United States Patent [19]

Sakamoto

[11] Patent Number: 5,011,420

[45] Date of Patent: Apr. 30, 1991

[54] CONNECTOR APPARATUS HAVING AN EJECTING MECHANISM

[75] Inventor: Haruo Sakamoto, Yokohama, Japan

[73] Assignee: E. I. Du Pont de Nemours and Company, Wilmington, Del.

[21] Appl. No.: 484,972

[22] Filed: Feb. 26, 1990

[30] Foreign Application Priority Data

Mar. 1, 1989 [JP] Japan ................ 1-21982[U]

[51] Int. Cl.$^5$ ............................. H01R 13/00
[52] U.S. Cl. .................................. 439/152
[58] Field of Search ................... 439/152–160

[56] References Cited

U.S. PATENT DOCUMENTS 3,052,863  9/1962  Uberacher et al. ............... 439/152
3,160,947 12/1964  Sunderlin ........................ 439/152
4,820,183  4/1989  Knapp et al. .................... 439/152

Primary Examiner—Joseph H. McGlynn

[57] ABSTRACT

A connector apparatus to be connected to an IC pack comprises housing means for receiving and holding the IC pack inserted thereto, connector means for connecting electrically to the inserted IC pack, ejecting means for ejecting the inserted IC pack from the connector means having at least two ejecting arms having a U-shaped cross section, two opposing sections of the ejecting arm sandwiching the housing means, and the other section perpendicular to the opposing sections being arranged to contact with the front end of the IC pack, and means for activating the ejecting means so as to eject the IC pack from the connector means by pulling out with the ejecting arms kept in contact with the front end of the IC pack.

3 Claims, 3 Drawing Sheets

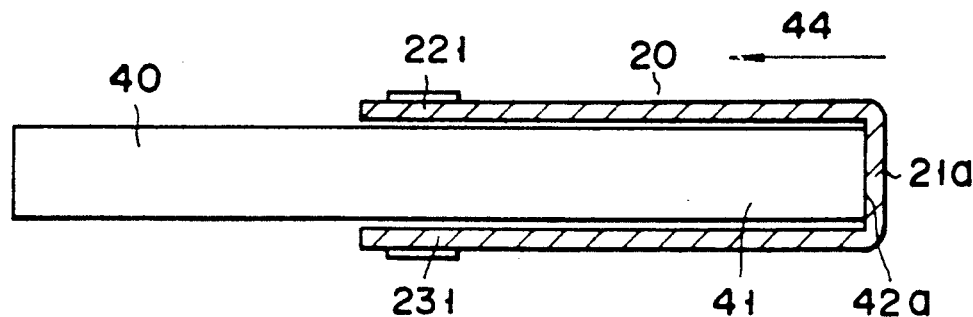
F I G. 5
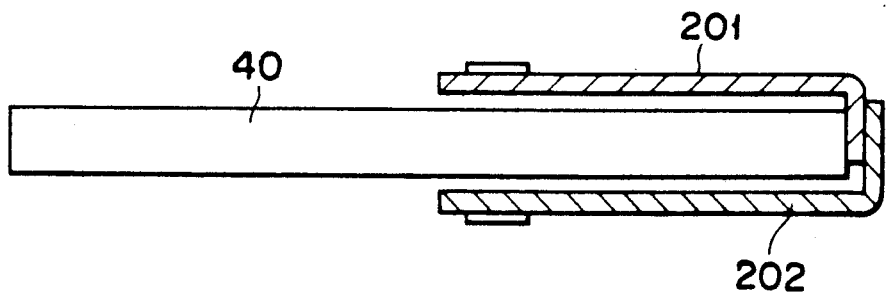
F I G. 6
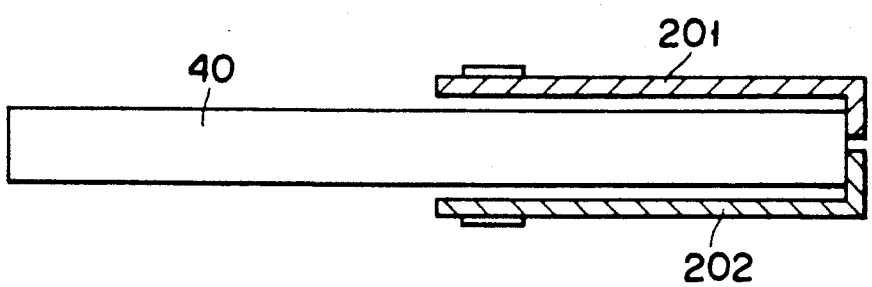
F I G. 7

5,011,420

CONNECTOR APPARATUS HAVING AN EJECTING MECHANISM

BACKGROUND OF THE INVENTION

1. Field of the Invention

The present invention relates to a connector apparatus having a connector section to be electrically connected to a flat IC pack, such as a memory card, and, in particular, to a connector apparatus having an ejecting mechanism for ejecting an IC pack connected to the connector section of the connector apparatus.

2. Description of the Related Art

An IC pack, such as a memory card, is inserted into a connector apparatus through an insertion opening of the connector apparatus to make an electrical connection to the connector section of the connector apparatus. This electrical connection is achieved by engaging socket terminals of a memory card arranged in an array manner over the corresponding pin terminals of the connector section of the connector apparatus arranged in an array manner. Since a total force for its engagement is very great due to a greater number of mating terminals involved, a greater force is required to eject the memory card from the connector apparatus.

A conventional connector apparatus is shown in FIG. 1. A sheet-like ejecting lever 51 with a bent portion 51a provided at an end is employed in order to eject the memory card 53 from the connector apparatus. The ejecting lever 51 is formed so that an inner face 52 of the bent portion of the engaging lever 51 pushes a front end face 54 of the memory card 53 so as to be removed from the connector apparatus in an ejecting direction of an arrow 55. The ejecting lever 51 needs a considerable thickness 57 and is required to be enough rigid to prevent deformation of a bending corner 56 during the ejecting operation. It is, therefore, difficult to reduce the thickness of the connector apparatus as a whole.

Alternatively, there is a conventional bar-type ejecting lever 58 which pushes the front end face 54 of the memory card 53 as shown in FIG. 2. In this case, the thickness of the connector apparatus including the ejecting lever can be maintained to be thinner than the benting-type lever shown in FIG. 1. However, the connector apparatus becomes relatingly larger, because the ejecting lever is long in the longitudinal direction and requires a greater space in the connector apparatus.

SUMMARY OF THE INVENTION

It is accordingly the object of the present invention to provide a thin and compact connector apparatus having ejecting mechanism.

According to the present invention there are preferably provided a connector apparatus to be connected to an IC pack comprising: a housing means for receiving and holding the IC pack inserted thereto; a connector means for contacting electrically to the inserted IC pack; ejecting means for ejecting the inserted IC pack from the connector means having at least two ejecting arms having a U-shaped cross section, two opposing sections of the ejecting arm sandwiching the housing means, the other section perpendicular to the opposing sections being arranged to contact with the front end of the IC pack; and means for activating the ejecting means so as to eject the IC pack from the connector means with the ejecting arms kept in contact with the front end of the IC pack, and a connector apparatus which comprises: a housing having an insertion section through which a substantially flat IC pack is inserted with its front end face oriented to the connector apparatus, a connector section electrically connected to the inserted IC pack, and a housing section between the insertion section and the connector section; the housing section having first and second parallel flat sheet like portions and an ejecting lever for pushing the IC pack, which has been electrically connected to the connector section, in a direction toward the inserting section of the housing; characterized in that the ejecting lever is formed of a thin sheet member, the thin sheet member has first and second lever portions which extend along the first and second flat sheet like portions, respectively, and an IC pack contacting portion which extends from ends of the first and second lever portions vertically relative to the first and second flat sheet portions and contacts with the front end face of the IC pack, which has been electrically connected to the connector sections; and the first and second lever portion of the ejecting lever are each connected to a corresponding drive link, respectively, the link having a pivot provided on a corresponding one of the first and second flat sheet like portions of the housing section.

Upon the rotating of the drive link of the connector apparatus, the first and second lever portions of the ejecting lever are pulled out in the direction toward the insertion section of the housing and hence the IC pack contacting portion of the ejecting lever is moved in a direction toward the insertion section of the housing.

According to the present invention, since the ejecting lever is of such a type that it covers the front portion of the memory card, it takes no extra occupation area in the connector apparatus. Furthermore, since the ejecting lever is driven at two locations, that is, the first and second lever portions, during the ejecting operation deformation of the ejecting lever scarcely occurs even if the ejecting lever is made up of a thin sheet. As a result, it is possible to assemble a connector device as a thin and compact unit.

BRIEF DESCRIPTION OF THE DRAWINGS

FIG. 5 is a cross-sectional view showing the ejecting lever and the memory card of the connector apparatus of FIG. 3;

FIG. 6 is a cross-sectional view similar to the FIG. 5, of a connector apparatus according to a second embodiment of the present invention; and FIG. 7 is a cross-sectional view similar to the FIG. 5, of a connector apparatus according to a third embodiment of the present invention.

BRIEF DESCRIPTION OF THE PREFERRED EMBODIMENTS

Figure 1:
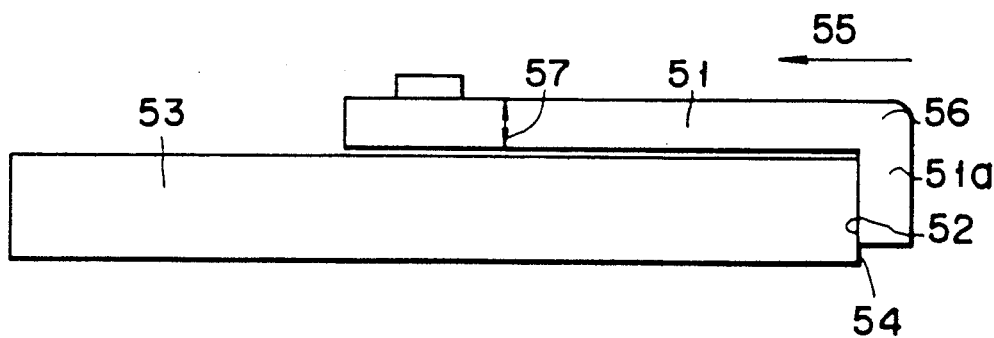
FIGS. 1 and 2 are cross-sectional views showing an ejecting lever and a memory card in a conventional connector apparatus each.
Figure 2:
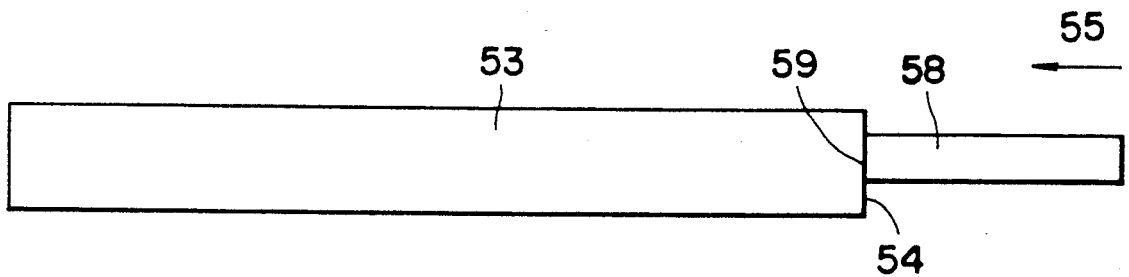
Figures 3, 4:
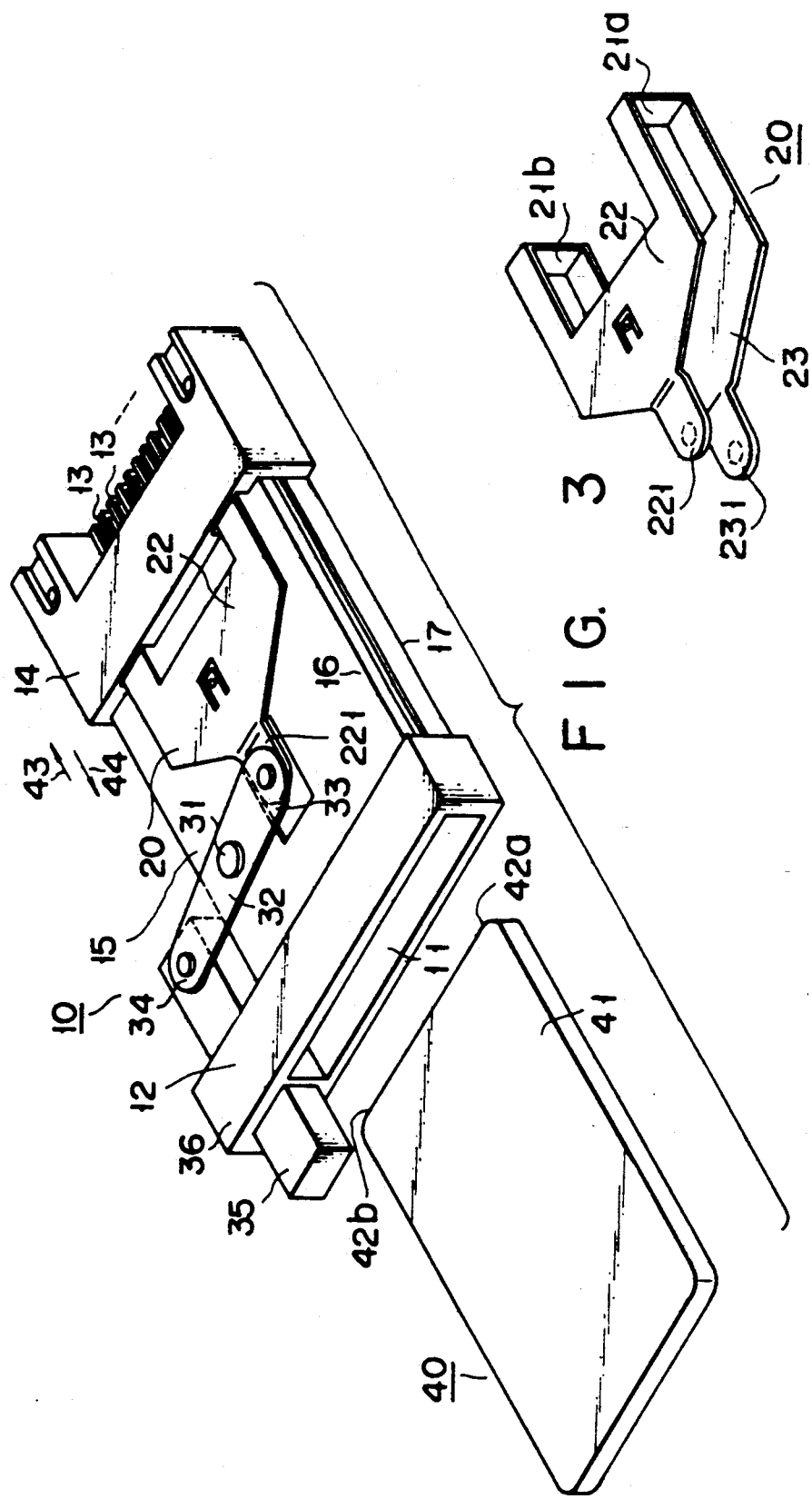
FIG. 3 is a perspective view showing a connector apparatus according to a first embodiment of the present invention.
FIG. 4 is a perspective view showing an ejecting lever of the connector apparatus of FIG. 3.

In FIG. 3, a connector apparatus 10 according to one embodiment of the present invention and a memory card 40 to be inserted into the connector apparatus 10 are shown.

The connector apparatus 10 comprises a housing having an insertion section 12 including an insertion opening 11 through which the memory card 40 is inserted; a connector section 14 provided on a side opposite to the side of the insertion section 12 and including an array of a greater number of pin terminals 13; and a housing section 15 between the insertion section 12 and the connector section 14. The memory card 40 has a greater number of socket not shown, in the front portion 41. When the memory card 40 is inserted into the connector apparatus 10, the socket terminals are each fitted over a corresponding pin terminal 13 to achieve an electrical connection.

The housing section 15 of the connector apparatus 10 has flat sheet like sections 16 and 17 parallel to each other.

The present connector apparatus comprise ejecting means for ejecting the inserted IC card from the connector. The ejecting means has at least two ejecting arms having a U-shaped cross section. Two opposing sections of the ejecting arm sandwich the housing, and the other section perpendicular to the opposing sections is arranged to contact the front end face of the IC card. Specifically, preferably, an ejecting lever 20 is mounted over the flat sheet like sections 16 and 17. The ejecting lever 20 is U-shaped in cross-section as shown in FIG. 4 and has vertical portions 21a, 21b and first and second lever portions 22 and 23 which horizontally extend from the upper and lower edges of the vertical portions 21a, 21b. The ejecting lever 20 is made up of a rigid thin sheet and so shaped and dimensioned that, when the memory card 40 is inserted between the first lever portion 22 and the second lever portion 23, the vertical portions 21a and 21b of the ejecting lever 20 confront both the end portions of 42a and 42b of the front end face of the memory card 40.

As shown in FIG. 3, the ejecting lever 20 is fitted over the housing section 15 such that the first and second lever portions 22 and 23 cover the outer surfaces of the first and second flat sheet like sections 16 and 17 and that the lever 20 can be moved in both the directions in which the memory card is inserted into, and withdrawn from, the connector apparatus 10, that is, an inserting direction 43 from the insertion section 12 toward the connector section 14 and a withdrawing direction 44 from the connector section 14 toward the insertion section 12.

An end portion 221 of the first lever portion 22 of the ejecting lever 20 is connected to one end 33 of a first drive link 32. The first drive link 32 rotates with a pivot 31 as a center, the pivot 31 being provided on the first flat sheet like portion 16. The other end 34 of the first drive link 32 is connected to a button 35. Similarly, an end portion 231 of the second lever portion 23 of the ejecting lever 20 is connected to one end of a second drive link, not shown, which rotates with a pivot as a center, the pivot being provided on the second flat sheet like portion 17, and the other end of the second link is connected to the button 35. The connection between the second lever portion 23 and the second drive lever has a positional symmetry with respect to the connection between the first lever portion 22 and the first drive link 32. The button 35 is so mounted as to move through a frame 36 in the inserting/withdrawing direction of the memory card, the frame 36 being located outside of the insertion opening 11. Upon the sliding of the button 35 in the direction of the arrow 43 toward the connector section 14, the ejecting lever 20 is moved in the direction of an arrow 44 toward the insertion section 12 with rotating of the first and second drive links.

FIG. 5 is a cross-sectional view showing the ejecting lever 20 when the memory card 40, which has been inserted into the connector apparatus of the present invention, is being ejected. During the ejecting operation, the vertical portion 21a of the ejecting lever is kept in contact with the front end face 42a of the memory card 40, pushing out the memory card 40 in the direction as indicated by the arrow 44.

If the ejecting lever is so constructed that it has a U-shape in cross-section with the front portion 41 of the memory card covered therewith, and driven through both the end portions 221 and 231, it is not deformed during the ejecting operation even if the ejecting lever is formed of a thin sheet.

Although in the aforementioned embodiment, the vertical portion of the ejecting lever is continuous between one edge of the first lever portion and that of the second lever portion, the present invention is not restricted to that embodiment. For example, the ejecting lever can be formed of two separate members, that is, an upper member 201 and a lower member 202 as shown in FIGS. 6 and 7.

The connector apparatus of the present invention is easier to design and can be manufactured at lower costs. The connector apparatus can be more simply manufactured at low cost if being so formed as to have a positional symmetry between the first lever portion 22 and second lever portion 23, or between the upper and lower members 201 and 202.

What is claimed is:

1. A connector apparatus to be connected to an IC pack comprising:

housing means for receiving and holding the IC pack inserted thereto, connector means for contacting electrically to said inserted IC pack, ejecting means for ejecting said inserted IC pack from said connector means having at least two ejecting arms having a U-shaped cross section, two opposing sections of said ejecting arm sandwiching said housing means, and the other section perpendicular to said opposing sections being arranged to contact with the front end of said IC pack, and means for activating said ejecting means so as to eject said IC pack from said connector means.

2. A connector apparatus being connected to an IC pack to be inserted for conducting a contact between the respective terminals comprising:

a connector means having an array of terminals corresponding to the terminals of said IC pack for contacting electrically to said IC pack, a housing means for receiving and holding said inserted IC pack so as to assure a contact of the terminals of said IC pack with the terminals of said connector means, ejecting means for ejecting said inserted IC pack from said connector means having at least two ejecting arms having a U-shaped cross section, two opposing sections of said ejecting arm sandwiching said housing means, and the other section perpendicular to said opposing sections being arranged to contact the front end of said IC pack, and means for activating said ejecting means so as to eject said IC pack from said connector means.

3. A connector apparatus which comprises a housing having an insertion section through which a substantially flat IC pack is inserted with its front end face oriented to the connector apparatus, a connector section electrically connected to the inserted IC pack, and a housing section, between the insertion section and the connector section, the housing section having first and second parallel flat sheet like portions and an ejecting lever for pushing the IC pack, which has been electrically connected to the connector section, in a direction toward the inserting section of the housing, characterized in that the ejecting lever is formed of a thin sheet member, the thin sheet member has first and second lever portions which extend along the first and second flat sheet like portions, respectively, and an IC pack-contacting portion which extends from ends of the first and second lever portions vertically relative to the first and second flat sheet portions and contacts with the front end face of the IC pack, which has been electrically connected to the connector sections, and the first and second lever portion of the ejecting lever are each connected to a corresponding drive link, respectively, the drive link having a pivot provided on a corresponding one of the first and second flat sheet like portions of the housing section.

* * * * *